US010569859B2

(12) United States Patent
Everaert et al.

(10) Patent No.: US 10,569,859 B2
(45) Date of Patent: Feb. 25, 2020

(54) HIGH-LIFT DEVICE

(71) Applicant: Asco Industries NV, Zaventem (BE)

(72) Inventors: Bob Armand Henri Everaert, Zaventem (BE); Alexander Jean M. Verhuizen, Zaventem (BE); Raf Thys, Zaventem (BE); Tom Robert Adelin De Baere, Zaventem (BE); Michaël Raets, Zaventem (BE)

(73) Assignee: ASCO INDUSTRIES NV, Zaventem (BE)

( * ) Notice: Subject to any disclaimer, the term of this patent is extended or adjusted under 35 U.S.C. 154(b) by 366 days.

(21) Appl. No.: 15/484,305

(22) Filed: Apr. 11, 2017

(65) Prior Publication Data

US 2017/0291687 A1    Oct. 12, 2017

(30) Foreign Application Priority Data

Apr. 11, 2016   (EP) ..................... 16164704
Jun. 7, 2016    (EP) ..................... 16173405

(51) Int. Cl.
*B64C 9/02*      (2006.01)
*B64F 5/10*      (2017.01)
*B64D 15/12*     (2006.01)
*B64D 45/02*     (2006.01)

(52) U.S. Cl.
CPC ................ *B64C 9/02* (2013.01); *B64D 15/12* (2013.01); *B64D 45/02* (2013.01); *B64F 5/10* (2017.01)

(58) Field of Classification Search
CPC .... B64C 3/50; B64C 3/44; B64C 3/54; B64C 9/22; B64C 9/24; B64C 9/26; B64C 9/28
See application file for complete search history.

(56) References Cited

U.S. PATENT DOCUMENTS 5,114,100 A    5/1992  Rudolph
5,158,252 A   10/1992  Sakurai
(Continued)

FOREIGN PATENT DOCUMENTS

CA    2484119         4/2006
DE    19519469 A1    10/1996
(Continued)

OTHER PUBLICATIONS

European Search Report from EP App No. 16173405.8 dated Aug. 10, 2017.
(Continued)

*Primary Examiner* — Philip J Bonzell
*Assistant Examiner* — Tye William Abell
(74) *Attorney, Agent, or Firm* — Adsero IP (57) ABSTRACT

A high-lift device comprising an airfoil shaped body having a leading edge and a trailing edge and extending in a spanwise direction configured mainly to generate aerodynamic force; a profile structure arranged to be mounted inside of the airfoil shaped body and extending in spanwise direction of the airfoil shaped body that is configured to provide most of the mechanical strength and stiffness; wherein the airfoil shaped body is provided with an opening extending in spanwise direction at one side through which the profile structure can be fastened and remains accessible inside of the airfoil shaped body.

12 Claims, 7 Drawing Sheets

(56) References Cited

U.S. PATENT DOCUMENTS

| | | | |
|---|---|---|---|
| 5,931,422 A * | 8/1999 | Geiger | B64C 3/50 |
| | | | 244/214 |
| 8,424,801 B2 | 4/2013 | Wildman | |
| 8,622,350 B1 | 1/2014 | Hoffenberg | |
| 9,896,190 B1 * | 2/2018 | Amorosi | B64C 3/14 |
| 2003/0146346 A1 | 8/2003 | Chapman, Jr. | |
| 2003/0173460 A1 | 9/2003 | Chapman, Jr. | |
| 2006/0192058 A1 | 8/2006 | Arata | |
| 2007/0034746 A1 | 2/2007 | Shmilovich | |
| 2007/0051855 A1 | 3/2007 | Shmilovich | |
| 2007/0069084 A1 | 3/2007 | Arata | |
| 2007/0102586 A1 | 5/2007 | Arata | |
| 2008/0283675 A1 * | 11/2008 | Zuniga Sagredo | B64C 3/18 |
| | | | 244/35 R |
| 2011/0024566 A1 * | 2/2011 | Soenarjo | B64D 15/12 |
| | | | 244/131 |
| 2011/0108672 A1 | 5/2011 | Shmilovich | |
| 2012/0224964 A1 | 9/2012 | Clark | |
| 2012/0256049 A1 | 10/2012 | Shmilovich | |
| 2013/0061605 A1 | 3/2013 | de Rochemont | |
| 2013/0195672 A1 | 8/2013 | Lee | |
| 2014/0117166 A1 | 5/2014 | Campbell, Jr. | |
| 2014/0119878 A1 | 5/2014 | Shmilovich | |
| 2014/0166818 A1 * | 6/2014 | Tanaka | B64C 9/22 |
| | | | 244/214 |
| 2015/0090843 A1 | 4/2015 | Guering | |
| 2015/0174843 A1 * | 6/2015 | Crepin | B64C 9/22 |
| | | | 264/258 |

FOREIGN PATENT DOCUMENTS

| | | |
|---|---|---|
| DE | 102008051553 A1 | 4/2010 |
| EP | 1595787 A1 | 11/2005 |
| EP | 2139761 A1 | 10/2008 |
| EP | 2139762 B1 | 3/2012 |
| EP | 2330294 B1 | 1/2013 |
| EP | 2064115 B1 | 1/2014 |
| EP | 2340686 B1 | 12/2014 |
| EP | 2842867 A1 | 3/2015 |
| WO | WO 2001/057354 | 9/2001 |
| WO | WO 2008/124352 | 10/2008 |

OTHER PUBLICATIONS

Office Action from EP App. No. 16173405.8 dated Apr. 4, 2019.
Sloan (2008) Composites World, pp. 1-6, available at: https://www.compositesworld.com/articles/787-integrates-new-composite-wing-deicing-system, "787 integrates new composite wing deicing system".

* cited by examiner

HIGH-LIFT DEVICE

RELATED APPLICATIONS

This application claims priority to European Application Nos. 16164704.5, filed Apr. 11, 2016 and 16173405.8, Jun. 7, 2016, each of which is incorporated herein by reference in its entirety.

TECHNICAL FIELD

The disclosure relates to a high-lift device, such as a leading edge high-lift device or a trailing edge high-lift device.

BACKGROUND

High-lift devices are well known and are typically mounted to a leading edge and/or to a trailing edge of an aircraft wing to provide for additional aerodynamic forces during certain stages of a flight, in particular during low speed stages, e.g. during take-off, climb, descent or landing.

High-lift devices can be embodied as a flap, e.g. a trailing edge flap, or as a leading edge slotted flap, typically referred to as slat. Another type of leading edge high-lift device can be a Krueger flap. Many embodiments of a high-lift device can be possible.

Typically a high-lift device is provided as an airfoil shaped body with stiffeners and ribs inside of the body to provide for sufficient strength and stiffness, having a similar structure as an aircraft wing. High-lift devices usually need to comply with rather severe requirements in terms of bird strike, de-icing, lighting strike, erosion resistance, as well as usual mechanical strength and stiffness requirements. The combination of these requirements often leads to a relatively heavy structure, which is disadvantageous as these devices need to be connected to the aircraft wings thus impacting the payload of the aircraft wing.

There is a need for a relatively light-weight, but high performing, high-lift device. It is an object of the disclosure to provide for a high-lift device that is relatively light weight, and may comply with regulatory and/or other requirements.

SUMMARY OF THE EMBODIMENTS

A high-lift device is provided that comprises an airfoil shaped body having a leading edge and a trailing edge and extending in a longitudinal direction configured to generate aerodynamic force; a profile structure arranged to be mounted inside of the airfoil shaped body and extending in longitudinal direction of the airfoil shaped body that is configured to provide mechanical strength and stiffness; wherein the airfoil shaped body is provided with a longitudinally extending opening, i.e. an opening extending in spanwise direction of the high-lift device, at a side through which the profile structure is accessible and/or can be positioned inside of the airfoil shaped body. The longitudinal direction is also referred to as the spanwise direction. Both terms are used interchangeable in this specification.

By providing an airfoil shaped body in which a profile structure can be inserted, the profile structure can be configured to cope with most of the mechanical loads, i.e. forces and moments, and to provide for sufficient stiffness and strength to comply with requirements such as bird strike. The airfoil shaped body can thus be considered as a fairing-like structure to provide for the aerodynamic shape and thus to generate the aerodynamic forces of the high-lift device. Since the high-lift device can, depending on the regulatory and/or other requirements, be allowed to partially fail above certain predefined limits, the airfoil shaped body, as a fairing-like structure, may partly fail, while the profile structure can remain sufficiently intact to cope with most of the remaining loads. As such, the aerodynamic function and the mechanical function of the high-lift device can be separated, with the airfoil shaped body providing for the aerodynamic function and the profile structure providing for most of the structural function. The profile structure provides for mainly the mechanical function, i.e. it provides for sufficient strength and stiffness and takes the loads. The airfoil shaped body provides substantially for the aerodynamic function to generate aerodynamic loads.

The side can be the lower side or the upper side of the airfoil shaped body.

Advantageously, the profile structure is configured to take most of the mechanical loads. As such, the profile structure can be dimensioned to withstand most of the loads to comply with at least certification and other requirements. Preferably, the profile structure has at least a first leg, a second leg and a third leg bridging the first and the second leg, thus forming a U-shaped structure. Although also a box shaped structure may be possible, that further has a fourth leg bridging the first and the second leg opposite the third leg. Such structures can be advantageously dimensioned to withstand the required loads.

When providing a U-shaped profile structure, advantageously, the profile structure is being inserted in the airfoil shaped body through the opening at the lower side thereof, with the third leg facing towards the upper side of the airfoil shaped body. As such, an inner side of the U-shaped profile structure remains accessible after insertion into the airfoil shaped body, for example for fastening the legs of the profile structure to the connecting structures of the airfoil shaped body, or for putting cabling etc. into the profile structure.

After fastening the profile structure to the airfoil shaped body and/or putting all cabling and other devices into the profile structure, the opening in the lower side may be closed by a closing plate. Preferably, the closing plate is connectable to the profile structure, as this is the force taking structure. Advantageously, the closing plate may provide for additional stiffness to the high-lift device. Alternatively, the closing plate may be connected to the airfoil shaped body. As such, embodiments can be thought of in which the closing plate is provided as a closing lid hingedly connected to the airfoil shaped body, e.g. for ease of maintenance Advantageously, device mounting structures for mounting the high-lift device to a further aerodynamic lift device, such as a wing, are provided on the profile structure. By providing these mounting structures on the profile structure, the aerodynamic shaped body can remain clean of protrusions and/or external structures and can be entirely configured as a fairing-like structure. Between the mounting structures, the closing plate is provided to cover the gap. The device mounting structures can be e.g. ribs or lugs with which the high-lift device can be connected to a support and deployment mechanism e.g. comprising rails, rollers, links and/or rods mounted on a wing along which the high-lift device can be deployed. Typically, such a high-lift device like a flap or a slat is deployable between a position in which the high-lift device is stowed in or adjacent the wing, usually a so-called in-flight position, and a position in which the high-lift device is deployed substantially outside of the wing to provide additional aerodynamic forces during certain stages of a flight. Alternatively, the mounting structures may be provided on the closing plate, which may be, e.g. locally, reinforced closing plates. By providing these mounting structures on the closing plates, the closing plates can be fully prepared and manufactured in advance and then, be mounted to the profile structure and/or airfoil shaped body. As such, assembly of the high-lift device may be more time efficient and/or more cost efficient.

In an embodiment, the airfoil shaped body is provided from a fiber reinforced material. As such, the airfoil shaped body can be manufactured relatively light-weight.

In an embodiment, the profile structure is of a metallic material. As such, the profile structure can be designed for taking most of the required loads and providing the required strength and/or stiffness. Also, the closing plate can relatively easily be connected to a metallic profile structure. The closing plate can be manufactured relatively thin and/or light weight as well.

In the airfoil shaped body, connecting structures can be provided that are configured for connecting with the profile structure. Typically, the connecting structures of the airfoil shaped body can be a rib extending in spanwise direction along the lower inner side and/or along the upper inner side and/or may be multiple transverse ribs extending in a direction transverse to the spanwise direction of the airfoil shaped body, e.g. in a direction of the chord of the airfoil shaped body. Many variants of the connecting structures may be possible. The connecting structures can be integrally formed with the airfoil shaped body, which is particularly suitable when the airfoil shaped body is manufactured from a fiber reinforced material. The connecting structures are preferably configured such that the profile structure can be easily connected to the connecting structure. For example, a leg of the profile structure can be connected by means of e.g. bonding, adhesive or fastening means with the connecting structures, or a combination thereof. Advantageously, the connecting structures and the legs of the profile structure have the same or similar orientation such that they can relatively easily be engaged and/or abut against each other to be connected.

Further, a method is provided for manufacturing a high-lift device and a wing is provided with such a high-lift device.

Further advantageous embodiments are represented in the sub-claims.

Various modifications and additions can be made to the embodiments discussed without departing from the scope of the invention. For example, while the embodiments described above refer to particular features, the scope of this invention also included embodiments having different combination of features and embodiments that do not include all of the above described features.

BRIEF DESCRIPTION OF THE DRAWINGS

Above and further aspects are elucidated on the basis of exemplary embodiments which are represented in the drawings. The exemplary embodiments are given by way of non-limitative illustration. It is noted that the figures are only schematic representations of embodiments of the disclosure that are given by way of non-limiting example.

In the figures, the same or corresponding parts are designated with the same reference numerals.

DETAILED DESCRIPTION

Figure 1:
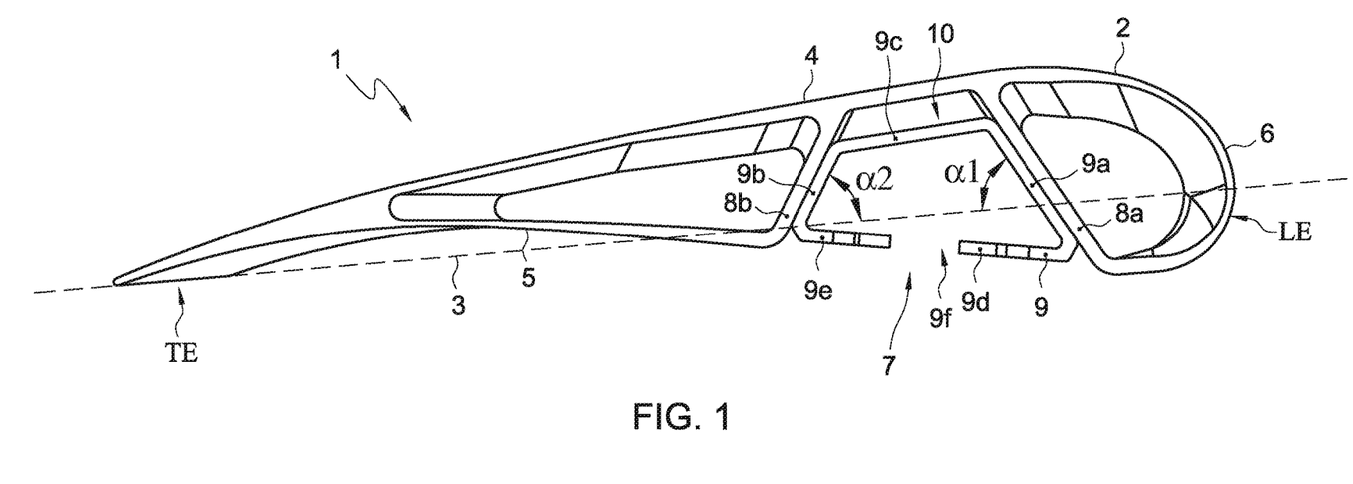
FIG. 1 a schematic perspective view of a first embodiment of a high-lift device.

FIG. 1 shows a schematic perspective view of a high-lift device 1. The high-lift device 1 has an airfoil shaped body 2 with a leading edge LE and a trailing edge TE. The leading edge LE faces forward flight direction. The leading edge LE can also be referred to as the nose of the airfoil shaped body 2. Between the leading edge LE and the trailing edge TE, a chord line 3 can be drawn. The high-lift device 1 extends in a spanwise direction A substantially transverse to the chord line 3. The spanwise direction A can be better viewed in e.g. FIG. 3. The airfoil shaped body 2 is configured for generating aerodynamic forces, at low speed flight stages. The high-lift device 1 can be tapered or non-tapered (straight).

Between the leading edge LE and the trailing edge TE of the airfoil shaped body 2 the airfoil shaped body comprises an upper side 4 and a lower side 5. The upper side 4 and the lower side 5 join each other to form a nose 6 at the leading edge LE. At the lower side 5 of the airfoil shaped body an opening 7 is provided. The opening 7 extends over a part of the lower side and extends in longitudinal direction of the airfoil shaped body. Advantageously, the opening 7 extends over approximately the whole length or over the whole length of the airfoil shaped body 2.

In this embodiment, connecting structures 8a, 8b are provided in the airfoil shaped body 2. The connecting structure 8a has a more forward position than the connecting structure 8b. The connecting structure 8a is facing the leading edge LE, while the connecting structure 8b is facing the trailing edge TE. In an embodiment, the connecting structure 8a may be positioned at a leading edge-side of the airfoil shaped body and the connecting structure 8b may be positioned at a trailing-edge side of the airfoil shaped body 2. Here, the connecting structures 8a, 8b extend between the upper side 4 and the lower side 5 to form a spar structure extending in spanwise direction inside of the airfoil shaped body 2.

The high-lift device 1 further comprises a profile structure 9 that is arranged to be mounted inside of the airfoil shaped body 2. The profile structure 9 extends also in spanwise direction A. Preferably, the profile structure 9 is approximately as long as the airfoil shaped body 2. Advantageously, the profile structure 9 fits inside of the airfoil shaped body 2. The profile structure 9 is configured to provide the required strength and/or stiffness to the high-lift device, also with respect to requirements regarding bird strike, lightning strike, fatigue etc. By providing the profile structure 9 configured for receiving most of the required mechanical loads, and a separate airfoil shaped body, configured to generate aerodynamic loads, the functions of aerodynamics and mechanics are mainly separated. As such, the airfoil shaped body 2 can merely be considered a fairing-like structure, while the profile structure 9 provides for sufficient required strength and/or stiffness.

Advantageously, the profile structure 9 can be inserted into the airfoil shaped body 2 through the opening 7. As such, manufacturing of the airfoil shaped body 2 and of the profile structure 9 may be separate, and after individual manufacturing, the high-lift device 1 can be assembled by inserting the profile structure 9 into the airfoil shaped body 2. Advantageously, the profile structure 9 remains accessible through the opening 7 e.g. for fastening and/or other operations, such as providing access to install wiring and/or cabling on the profiled structure.

In this embodiment, the profile structure 9 comprises a first leg 9a facing towards the leading edge LE, a second leg 9b facing towards the trailing edge TE and a third leg 9c bridging the first leg 9a and the second leg 9b. The third leg 9c is facing towards the upper side 4 of the airfoil shaped body 2. As such, in this embodiment, the profiled structure 9 forms an upside-down U-shaped form. After assembly into the airfoil shaped body 2, the profiled structure 9 remains accessible through the opening 7. Due to the upside-down U-shaped form, also the inside of the profiled structure 9 remains accessible through the opening 9f. Here, the profiled shaped body 9 is also provided with a fourth leg 9d and a fifth leg 9e. The fourth leg 9d extends from the first leg 9a at a side opposite of the third leg 9c in a direction towards the second leg 9b. The fifth leg 9e extends from the third leg 9c at a side opposite of the third leg 9c in a direction towards the first leg 9a. Between the fourth leg 9d and the fifth leg 9c, there remains an opening 9f that is sufficiently large to access the inner side of the profiled structure 9. So, the inner side of the profiled structure 9 remains accessible, also after assembly, via the opening 7 and the opening 9f.

In this embodiment, the connecting structures 8a, 8b are arranged to provide a receiving space 10 in which the profiled structure 9 is receivable.

Here, in this embodiment, the connecting structure 8a, 8b are configured such as to engage with the first leg 9a and the second leg 9b respectively. The first leg 9a can then be connected to the first connecting structure 8a and the second leg 9b can then be connected to the second connecting structure 8b. The connection can be obtained by well-known means, such as chemical fastening means e.g. adhesive, glue, and/or mechanical fastening means, e.g. bolts, rivets etc. In particular when using mechanical fastening means such as rivets, it is advantageous to have the inner side of the profiled structure 9 accessible after assembly. The tooling for riveting can then be inserted through the opening 7, 9f to contact the first and/or second leg 9a, 9b to rivet them to the connecting structures.

In this embodiment, the connecting structures 8a, 8b are inclined with respect to the chord line 3. The first or leading connecting structure 8a has an angle α1 with respect to the chord line 3. The second or trailing connecting structure 8b has an angle α2 with respect to the chord line 3. The angles α1, α2 are so-called inner angles facing towards each other. The angles α1, α2 are typically between approximately 0 degrees and approximately 90 degrees. By inclining the connecting structures 8a, 8b with respect to the chord line 3 of the airfoil shaped body 2, it may be easier to manufacture the airfoil shaped body 2 as well as it may be easier to insert the profiled structure into the receiving space 10 provided by the connecting structures 8a, 8b of the airfoil shaped body 2.

In other embodiments, the connecting structures may be embodied differently. For example, the connecting structure 8a (or 8b) may be provided as an interrupted rib-like structure, e.g. having an upper part extending from the upper side 4 downwardly, and having a lower part extending from the lower side 5 upwardly. Also, the connecting structure 8b may be configured as such. Then, these four rib-like connecting structures provide for the receiving space.

Alternatively, the connecting structures may be oriented in a transverse direction, e.g. in a direction along the chord line or parallel to the chord line. The profile structure is then preferably also provided with transversely extending protrusions or lips that engage with the connecting structures to be connected with the connecting structures.

Figure 2:
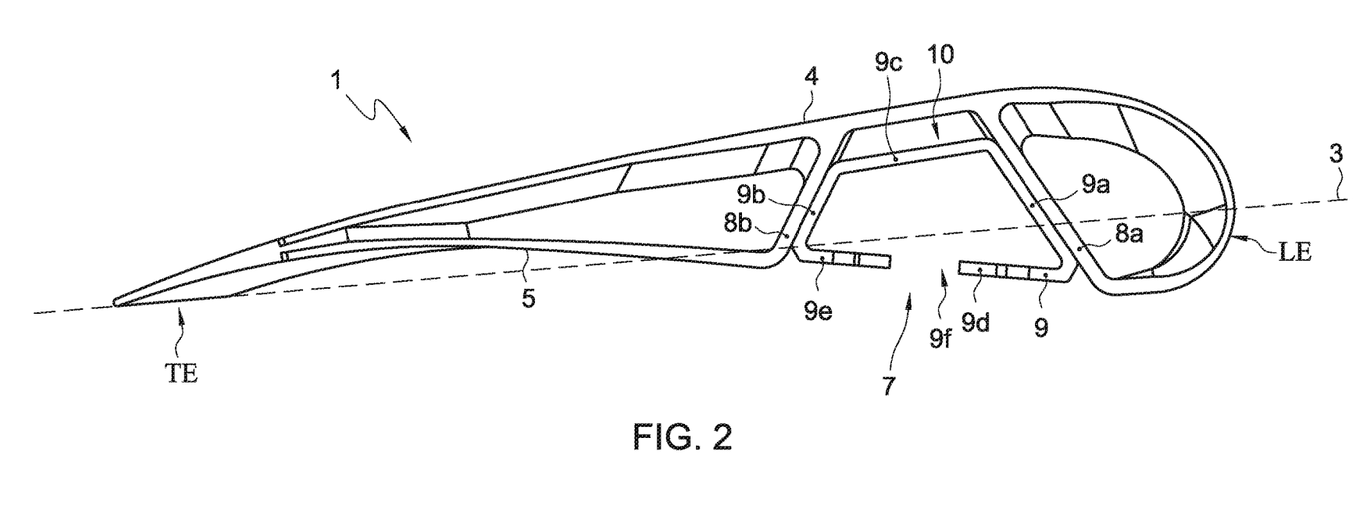
FIG. 2 a schematic perspective view of a second embodiment of a high-lift device.

In the embodiment shown in FIG. 1, the trailing edge TE is manufactured from the same material as the remainder of the airfoil shaped body, for example from the same fiber reinforced material. In the embodiment of FIG. 2, the trailing edge TE is manufactured from a different material, e.g. from a metallic material such as aluminum, which can be joined to the fiber reinforced structure of the airfoil shaped body 2.

Advantageously, the airfoil shaped body can be manufactured from fiber reinforced material, e.g. glass fiber reinforced plastics or another fiber reinforced composite material.

Advantageously, the profiled structure 9 is made from a metallic material, e.g. aluminum. The metallic profiled structure 9 may then be capable of taking most of the impact loads and to maintain the structural integrity of the high-lift device after bird impact, at least for the required get-home loads.

Figure 3:
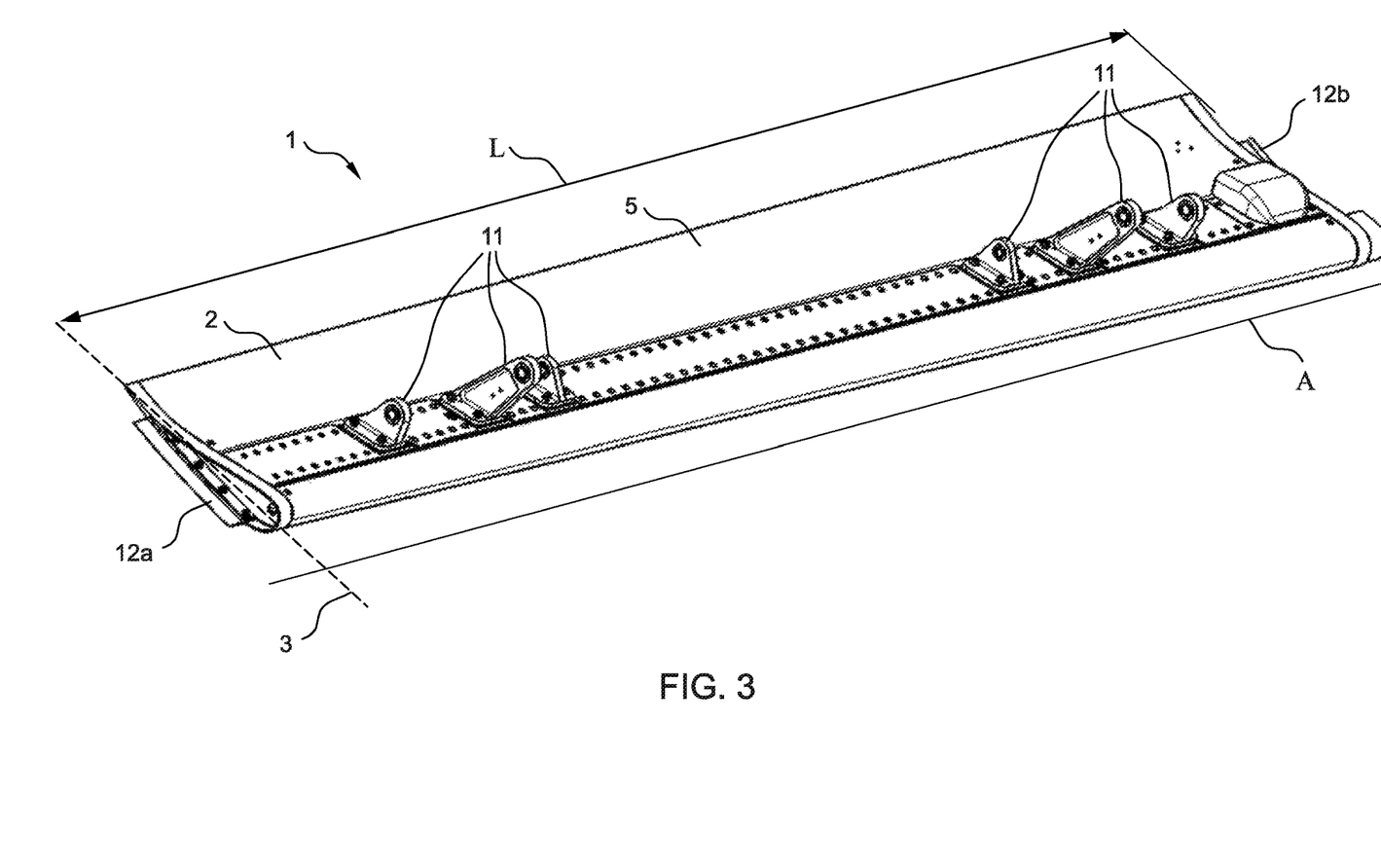
FIG. 3 a schematic perspective bottom side view of a third embodiment.
Figure 4:
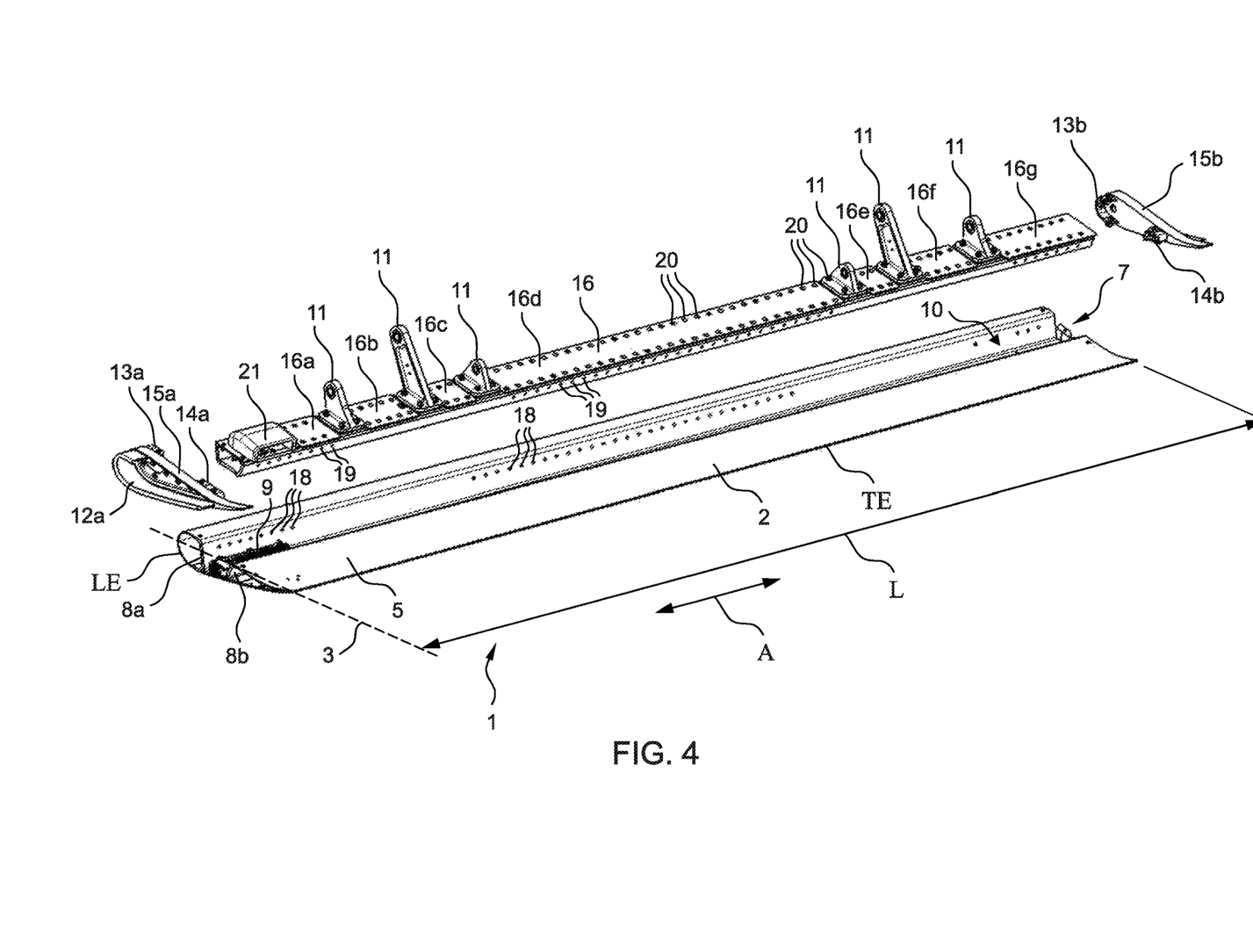
FIG. 4 a schematic exploded view of the embodiment of FIG. 3.

FIG. 3 shows a schematic perspective bottom side view of a high-lift device 1 having an airfoil shaped body 2 extending in a spanwise direction A over a length L. In FIG. 4 an exploded view is shown of the embodiment of FIG. 3. At the lower side 5, mounting structures 11 are provided with which the high-lift device 1 can be connected to a lift-generating structure such as an aircraft wing. Since the high-lift device 1 is normally deployable between a position in which it is within the wing, a so-called retracted position, e.g. during high-speed flight, and a position in which it is substantially outside of the wing, the mounting structures 11 are usually mounted to a deployment device e.g. comprising rails, rollers, links and/or rods. In the retracted position, the high-lift device usually does not or barely generate additional lift forces, whereas in the position outside of the wing, the high-lift device generates additional lift and/or drag for the specific low speed flight stages, such as take-off, climb, descend or landing.

The high-lift device 1 is at each end provided with a sealing end part 12a, 12b to cover the airfoil shaped body 2 at both ends from environmental influences and/or for aerodynamic purposes. The sealing end parts 12a, 12b are provided with flanges 13a, 13b, 14a, 14b that fit into the airfoil shaped body 2. The sealing end parts 12a, 12b are also provided with a cover plate 15a, 15b to close the sides of the airfoil shaped body 2.

The airfoil shaped body 2 is provided with an opening 7 in its lower side. The opening 7 extends over the length L of the airfoil shaped body 2 and over a part of the lower side 5, in a chordwise direction, i.e. in a direction of the chord line 3. Further, as in the embodiment of FIG. 1 and FIG. 2, the airfoil shaped body 2 is provided with connecting structures 8a, 8b having an inclination with respect to the chord line 3 and thereby forming a receiving space 10. In the receiving space 10, the profile structure 9 can be received.

The profile structure 9 can be inserted into the receiving space 10 through the opening 7. Advantageously, the profile structure 9 fits in the receiving space 10. More advantageously, the legs 9a, 9b of the profile structure 9 abut against the connecting structures 8a, 8b of the airfoil shaped body 2 as to be relatively easily connected to each other.

The profile structure 9 is provided as a U-shaped structure having a first leading edge leg 9a, a second trailing edge leg 9b and a third leg 9c bridging the first leg 9a and the second leg 9b. When assembled to the airfoil shaped body 2, the third leg 9c faces the upper side 4 of the airfoil shaped body 2. The profile structure 9 is here closed by a closing plate 16. The closing plate 16 can be a longitudinally extending plate that can be connected to the profile structure 9. For example, in case the profile structure 9 is provided with a fourth leg 9d and a fifth leg 9e, the closing plate 16 may be connected to the fourth and the fifth leg. Alternatively, the closing plate 16 may itself be provided with protruding flanges that mate with the profile structure 9.

The closing plate 16 may be embodied as a single plate that closes the profile structure 9. In such an embodiment, the mounting structures 11 can be mounted to the closing plate 16. Alternatively, as in the embodiment shown in FIG. 3 and FIG. 4, the closing plate 16 may be provided as multiple closing plate parts 16a, 16b, 16c, 16d, 16e, 16f, 16g etc. that are connected to the profile structure 9. In such an embodiment, the mounting structures 11 may be connected directly to the profiled structure 9 instead of being connected to the closing plate 16. This enables to transfer mechanical loads more efficiently and thus saves material and/or weight, which may be advantageous.

In assembled condition, as can be seen in FIG. 3, the closing plate 16 closes the opening 7 as to form a smooth lower side 5 of the airfoil shaped body. The mounting structures 11 extend from the lower side 5 to be connected to a wing structure.

Connection of the profiled structure 9 to the connecting structures 8a, 8b of the airfoil shaped body 2 can be done by means of fastening elements, such as rivets. In FIG. 4, holes 18, 19 can be seen through which rivets may be fastened. First, the profiled structure 9 is inserted in the receiving space 10 formed by the connecting structures 8a, 8b via the opening 7, and depending on the embodiment, also opening 9f, an inner side of the profiled structure 9 can be accessed and the rivets can be put through the holes 18, 19 to fasten the profiled structure 9 to the airfoil shaped body 2. Then, the opening 7 may be closed by the closing plate 16, in particular the closing plate parts 16a etc. and the mounting structures 11. The closing plate 16 and the mounting structures 11 can be connected to the profiled structure 9 by means of fastening elements, such as rivets, in a similar way as the profiled structure 9 is fixated to the airfoil shaped body 2. For example, in the fourth and fifth leg 9d, 9e of the profiled structure 9 holes may be provided which correspond with holes 20 on the closing plate 16 and on the mounting structure 11. Through these holes rivets can be fastened. Prior to closing the profiled structure 9 wiring and/or cabling as well as other components may be provided in the profiled structure 9.

Figure 5:
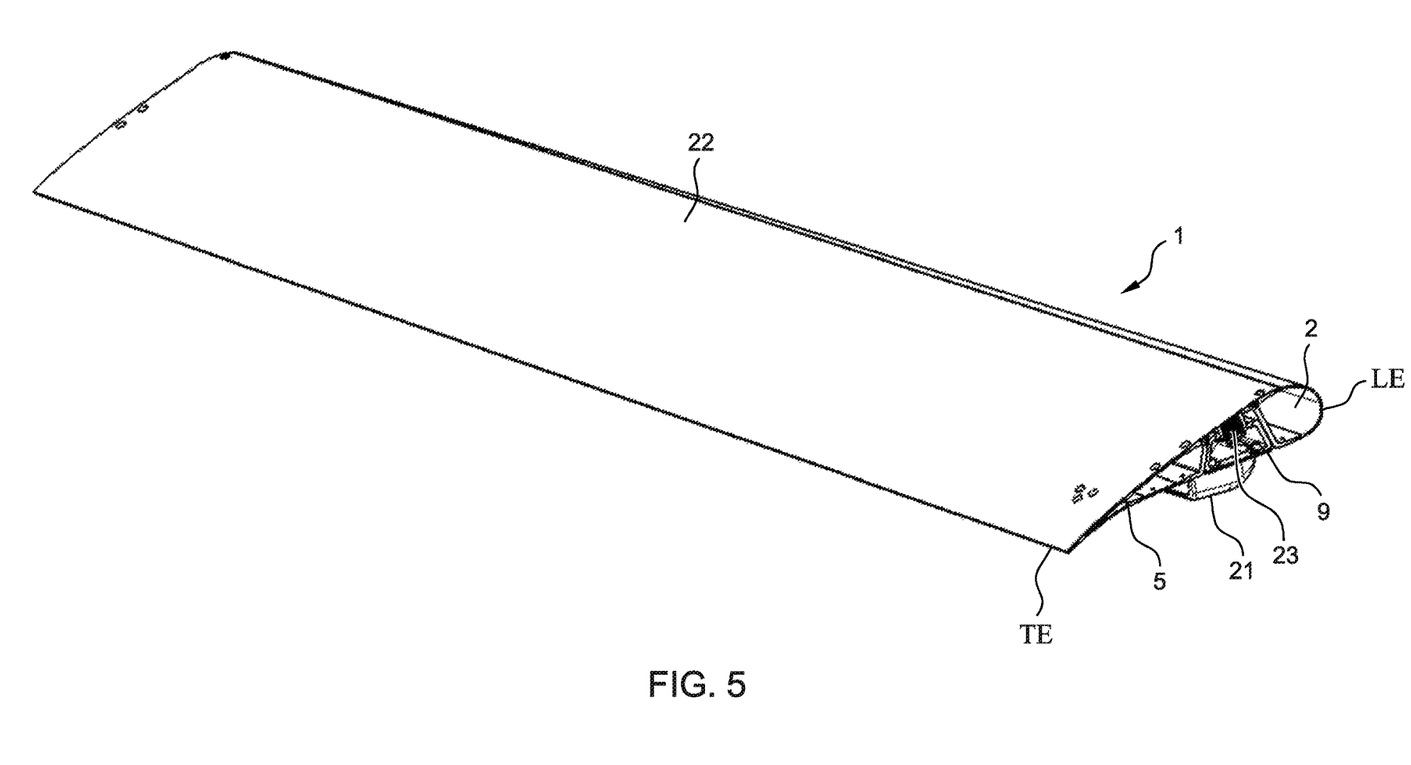
FIG. 5 a schematic perspective top side view of the embodiment of FIG. 3.

In some embodiments of the high-lift device 1, de-icing can be provided, for example by means of a de-icing heater mat. An electrical connection for such a de-icing unit can be provided onto the profiled structure 9 or on the closing plate 16. In FIG. 4, such an aerodynamically shaped electrical connection unit 21 is provided near an end of the airfoil shaped body 2. The de-icing heater mat is typically provided on the upper side 4 of the airfoil shaped body 2. Advantageously, the de-icing unit is an electrical heater mat which can be integrated with an anti-erosion shield. This is the case in the embodiment of FIG. 5. Here, the anti-erosion shield 22 is a thin metallic sheet in which the electrical heater mat is integrated. Thus, a combined sub-assembly of heater mat and anti-erosion shield is obtained, which can be assembled, e.g. by bonding, to the upper side 4 of the airfoil shaped body 2.

Figure 6A:
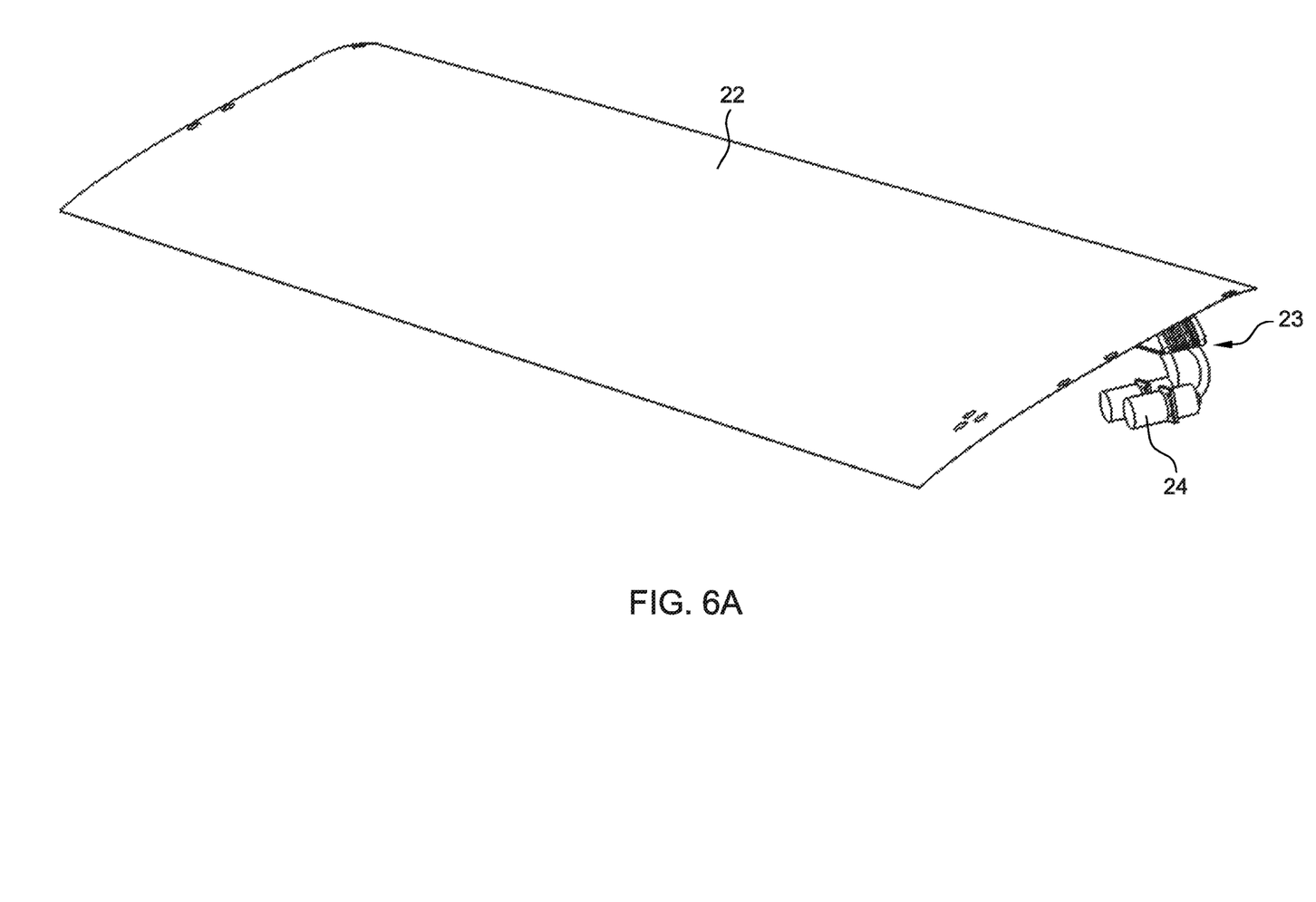
FIG. 6A a schematic perspective top side view of an anti-erosion shield for a high-lift device.
Figure 6B:
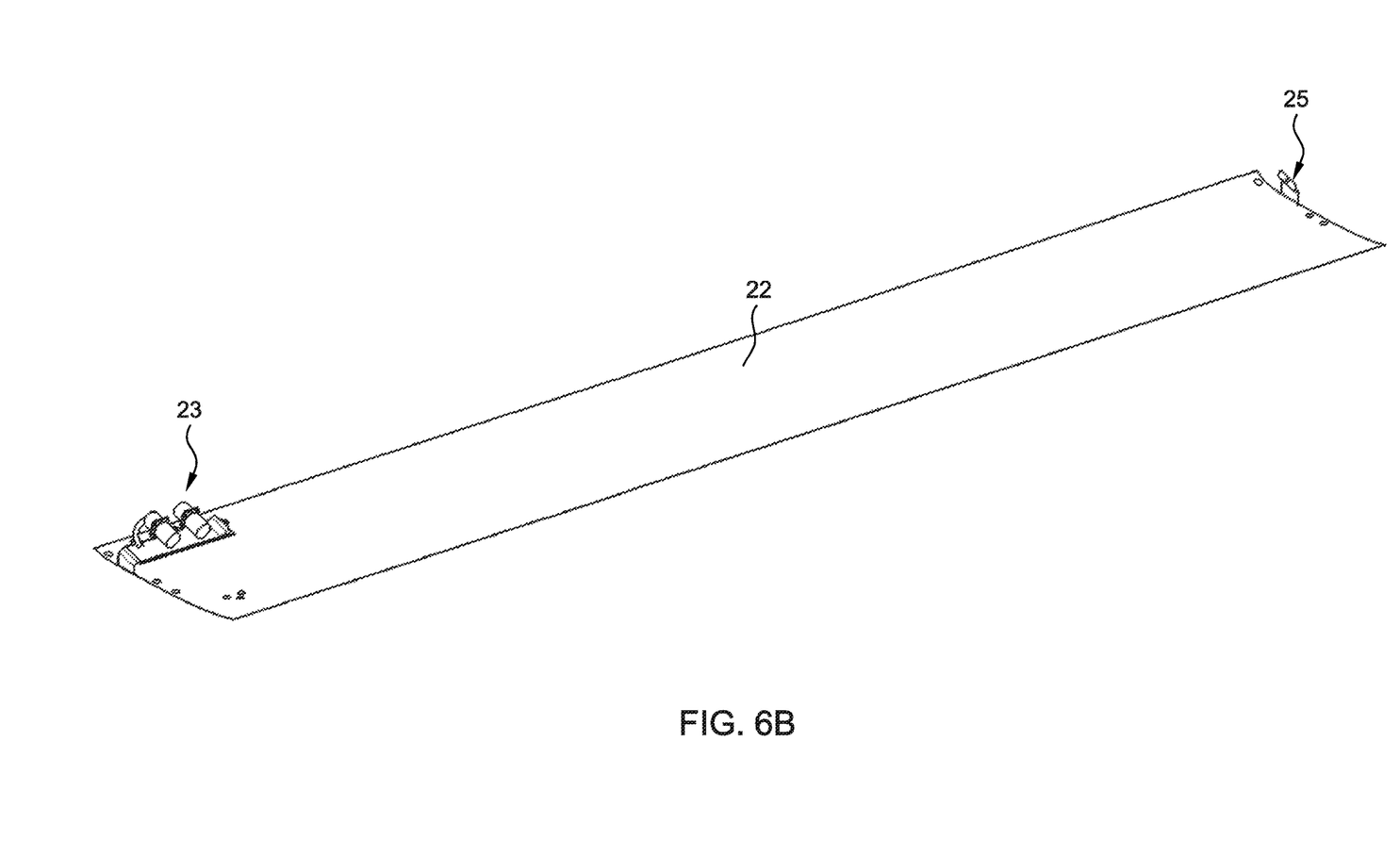
FIG. 6B a schematic perspective bottom side view of the anti-erosion shield of FIG. 6A.
Figure 6C:
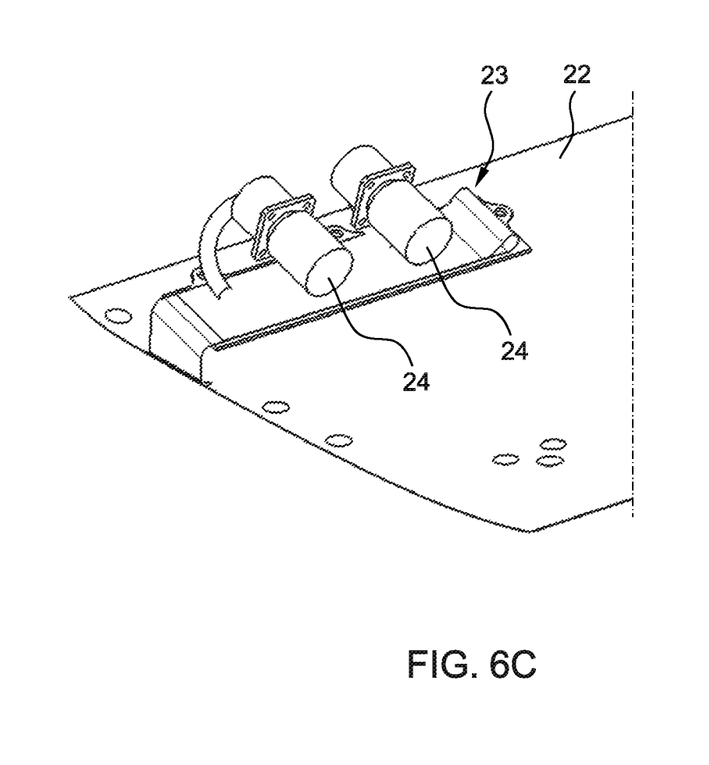
FIG. 6C a schematic perspective detailed view of an electrical de-icing connector unit of the anti-erosion shield of FIG. 6A and FIG. 6B.
Figure 6D:
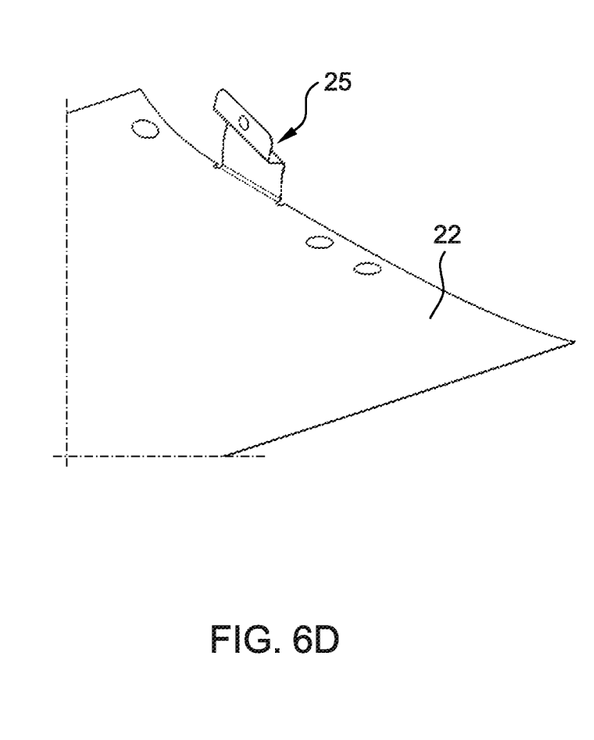
FIG. 6D a schematic perspective detailed view of an electrical bonding unit of the anti-erosion shield of FIG. 6A and FIG. 6B.

The electrical heating element is connected to the electrical system of the aircraft, preferably by means of an aerodynamically shaped electrical connector 23 as illustrated in FIGS. 6A-6D. In FIG. 6B, at one end of a bottom surface of the anti-erosion shield 22 connecting elements 24 are provided, at another end of the anti-erosion shield 22 an electrical contact plate 25 is provided. The connection elements are shown in an enlarged view in FIG. 6C and the contact plate is shown in an enlarged view if FIG. 6D. The connecting elements 24 and the contact plate 25, after bonding of the anti-erosion shield 22 to the upper side 4 of the airfoil shaped body 2, are housed inside of the profiled shaped body 9 and thus are housed in a more or less protected environment. The aerodynamically shaped electrical connecting unit 21 then may provide for the connection with the aircraft electrical system.

The heating element, as integrated to the anti-erosion shield 22, is preferably a resistive heater mat. The number of resistive circuits, ohmic value and permitted current may vary depending on design and/or other requirements.

Preferably, the heating element may have built-in temperature sensors and may give feedback of the temperature measurements to an aircraft control unit. Alternatively, the control unit may be mounted in the high-lift device 1 itself.

The heating element is also electrically bonded to the high-lift device 1 in view of lightning strike protection and to prevent build-up of static electricity. Electrically, the high-lift device 1 is preferably coupled to aircraft systems by separate connections for 'power' and 'signal' as to segregate these connection lines. The heater mat, the electrical connecting unit therefor and the erosion shield may be aspects on their own or in combination with each other.

For the purpose of clarity and a concise description, features are described herein as part of the same or separate embodiments, however, it will be appreciated that the scope of the disclosure also includes embodiments having combinations of all or some of the features described.

Many variants will be apparent to the person skilled in the art. All variants are understood to be comprised within the scope as defined in the following claims.

What is claimed is:

1. A high-lift device comprising
   an airfoil shaped body having a leading edge and a trailing edge and extending in a longitudinal direction configured to generate aerodynamic force, the airfoil shaped body not having structural elements to provide a required mechanical strength and stiffness;
   a profile structure arranged to be mounted inside of the airfoil shaped body and extending in the longitudinal direction of the airfoil shaped body, the profile structure being configured to provide a required mechanical strength and stiffness to the airfoil shaped body when mounted therein, the profile structure being a fully formed longitudinal structure having a cross-section transverse the longitudinal direction of a U-shape or box shape;
   wherein the airfoil shaped body is provided with a longitudinally extending opening at a lower side of the airfoil shaped body configured to receive the profile structure and through which the profile structure is accessible inside of the airfoil shaped body.

2. The high-lift device according to claim 1, wherein the longitudinally extending opening at the lower side of the airfoil shaped body is closed by a closing plate connectable to the profile structure.

3. The high-lift device according to claim 1, wherein device mounting structures for mounting the high-lift device to a further aerodynamic lift device are provided to the profile structure.

4. The high-lift device of claim 1, wherein the airfoil shaped body is provided from a fiber reinforced material.

5. The high-lift device of claim 1, wherein the profile structure is a metallic structure.

6. The high-lift device of claim 1, further providing an anti-erosion shield at an upper surface of the high-lift device.

7. The high-lift device according to claim 1, wherein the profile structure comprises at least a first leg for facing towards the leading edge of the airfoil shaped body, a second leg for facing towards the trailing edge of the airfoil shaped body and a top leg bridging the first leg and the second leg.

8. The high-lift device according to claim 7, wherein in the airfoil shaped body a first connecting structure is provided to which the first leg of the profile structure is connectable, and a second connecting structure is provided to which the second leg of the profile structure is connectable such that the top leg of the profile structure is facing the lower side of the airfoil shaped body.

9. The high-lift device of claim 1, wherein a de-icing heater mat is provided at an upper surface of the high-lift device.

10. The high-lift device of claim 9, wherein an electrical connecting unit for the de-icing heater mat is provided on a closing plate connectable to the profile structure, the closing plate being configured for closing the longitudinally extending opening at a bottom side of the airfoil shaped body.

11. A wing structure of an aircraft comprising at least one high-lift device according to claim 1.

12. A method for manufacturing a high-lift device comprising:
   providing an airfoil shaped body with a longitudinally extending opening at a bottom side thereof, the airfoil shaped body not having structural elements to provide a required mechanical strength and stiffness;
   providing a longitudinally extending profile structure, the profile structure being configured to provide a required mechanical strength and stiffness to the airfoil shaped body when mounted therein, the profile structure being a fully formed longitudinal structure having a cross-section transverse the longitudinal direction of a U-shape or box shape;
   inserting the profile structure into the opening of the airfoil shaped body;
   connecting the profile structure to the airfoil shaped body via the opening in the bottom side of the airfoil shaped body.

* * * * *